(12) United States Patent  (10) Patent No.: US 8,526,752 B2
Lin et al.  (45) Date of Patent: Sep. 3, 2013

(54) IMAGING SYSTEMS WITH FIXED OUTPUT SIZES AND FRAME RATES

(75) Inventors: Sheng Lin, San Jose, CA (US); Adam Zerwick, San Jose, CA (US); Kai Yau Mok, Cupertino, CA (US); Chi-Wen Chang, Cupertino, CA (US)

(73) Assignee: Aptina Imaging Corporation, George Town (KY)

( * ) Notice: Subject to any disclaimer, the term of this patent is extended or adjusted under 35 U.S.C. 154(b) by 182 days.

(21) Appl. No.: 12/861,760

(22) Filed: Aug. 23, 2010

(65) Prior Publication Data

US 2012/0044375 A1  Feb. 23, 2012

(51) Int. Cl.
G06K 9/36 (2006.01)
H04N 5/228 (2006.01)

(52) U.S. Cl.
USPC ................. 382/250; 382/232; 348/222.1

(58) Field of Classification Search
None
See application file for complete search history.

(56) References Cited

U.S. PATENT DOCUMENTS

| 5,196,938 | A | 3/1993 | Blessinger |
| 7,561,746 | B2* | 7/2009 | Sasaki ................ 382/232 |
| 7,711,938 | B2 | 5/2010 | Wise et al. |
| 2003/0196078 | A1 | 10/2003 | Wise et al. |
| 2005/0207726 | A1 | 9/2005 | Chen |
| 2006/0023079 | A1* | 2/2006 | Sugitani .............. 348/222.1 |
| 2006/0023109 | A1 | 2/2006 | Mabuchi et al. |
| 2006/0209335 | A1* | 9/2006 | Sasaki ................ 358/1.15 |
| 2008/0068675 | A1* | 3/2008 | Sakuda ................ 358/474 |
| 2008/0260273 | A1* | 10/2008 | Ito et al. ................ 382/245 |
| 2008/0266415 | A1* | 10/2008 | Noh .................... 348/222.1 |
| 2009/0022479 | A1* | 1/2009 | Kaku .................... 386/117 |
| 2009/0316779 | A1* | 12/2009 | Fukuhara et al. ........ 375/240.02 |
| 2010/0142811 | A1* | 6/2010 | Okamoto et al. ........ 382/166 |
| 2010/0328514 | A1* | 12/2010 | Hosoe et al. ............ 348/333.05 |
| 2010/0329580 | A1* | 12/2010 | Harada ................ 382/239 |

* cited by examiner

*Primary Examiner* — Lin Ye
*Assistant Examiner* — John H Morehead, III
(74) *Attorney, Agent, or Firm* — Treyz Law Group; David C. Kellogg

(57) ABSTRACT

An imaging system may include an image sensor and an image encoder that encodes images from the image sensor with fixed output sizes and frame rates. The image encoder may encode images from the image sensor into an image format such as a Joint Photographic Experts Group (JPEG) format. The image encoder may insert padding data between image blocks in the encoded data to compensate in real time for variations in the encoded size of an image. The amount of padding data inserted by the encoder may be calculated to ensure the encoded image has a file size close to, but not greater than, the required fixed output size. If needed, the encoder may add additional padding data after the image blocks are encoded in a blanking period before a subsequent image is encoded so that the final size of the encoded image is equal to the required output size.

19 Claims, 3 Drawing Sheets

| | | | | | | | |
|---|---|---|---|---|---|---|---|
| MCU$_0$ | MCU$_1$ | · | · | · | | | |
| | | | | | | | |
| | | | | | | | |
| | | | | | | | |
| | | | | | | | |
| | | | | | | | |
| | | | | | | | |
| | | | | · | · | · | MCU$_N$ |

FIG. 3
(PRIOR ART)

| | | | | | | | |
|---|---|---|---|---|---|---|---|
| DCT$_{00}$ | DCT$_{01}$ | · | · | · | | | |
| DCT$_{10}$ | | | | | | | |
| · | | | | | | | |
| · | | | | | | | |
| · | | | | | | | · |
| | | | | | | | · |
| | | | | | | | · |
| | | | | · | · | · | DCT$_{77}$ |

FIG. 4
(PRIOR ART)

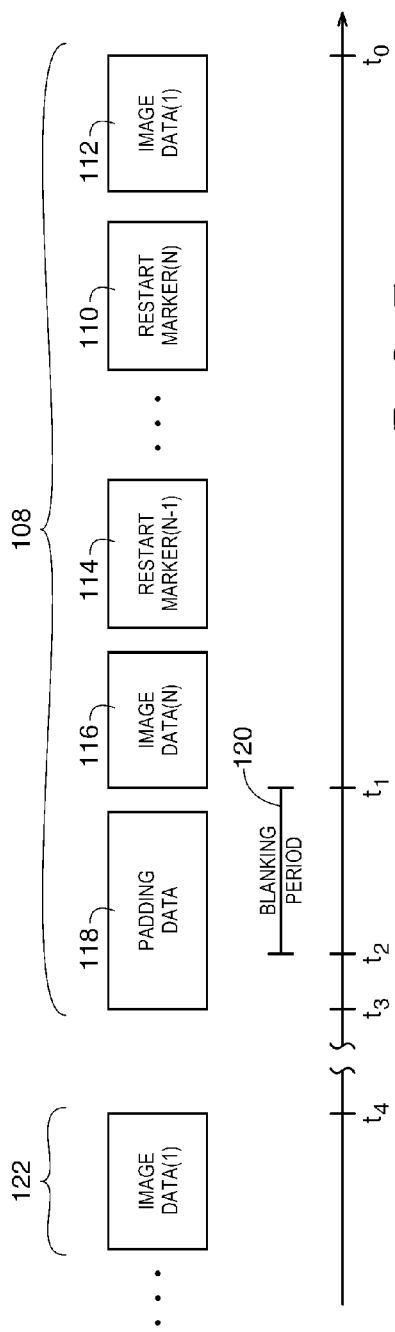
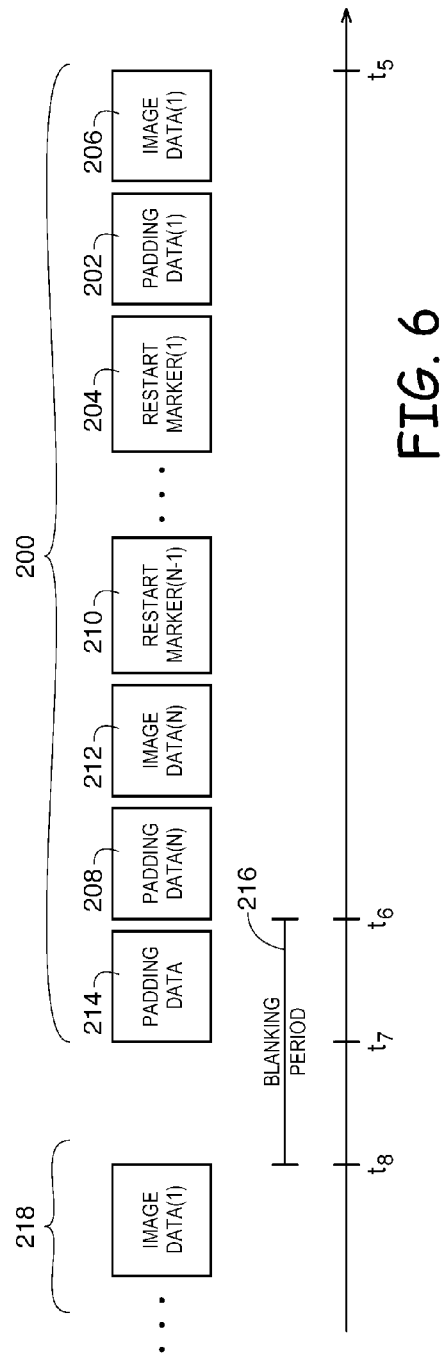

IMAGING SYSTEMS WITH FIXED OUTPUT SIZES AND FRAME RATES

BACKGROUND

This relates to imaging systems and, more particularly, to imaging systems that produce images with fixed output sizes and at constant frame rates.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Some electronic devices have fixed memory allocations and require that JPEG images from image sensors have a fixed size and be provided at a particular frame rate. In order to provide a JPEG image having a fixed size for an electronic device, an image encoder adds padding data at the end of a JPEG data stream during a vertical blanking period for the JPEG image. However, the vertical blanking period for each JPEG image does not always provide enough time for transmission of sufficient padding data (i.e., enough padding data that the size of the JPEG image reaches the required fixed size) and the transmission of the padding data sometimes extends into a subsequent frame, thereby resulting in the dropping of the subsequent image (i.e., resulting in the dropping of an image frame and a deviation from the required frame rate).

It would therefore be desirable to provide improved imaging systems that produce output data streams having fixed output sizes and constant frame rates.

BRIEF DESCRIPTION OF THE DRAWINGS

FIG. 3 is a diagram of image data before being processed by a conventional JPEG encoder.

FIG. 4 is a diagram of image data that has been converted to a frequency-domain representation using a discrete cosine transform (DCT) by a conventional Joint Photographic Experts Group (JPEG) encoder.

FIG. 5 is a diagram of data output from a conventional fixed output size JPEG encoder.

FIG. 6 is a diagram of data output from an image encoder that produces an output data stream that includes fixed-size images at a constant frame rate in accordance with an embodiment of the present invention.

DETAILED DESCRIPTION

Figure 1:
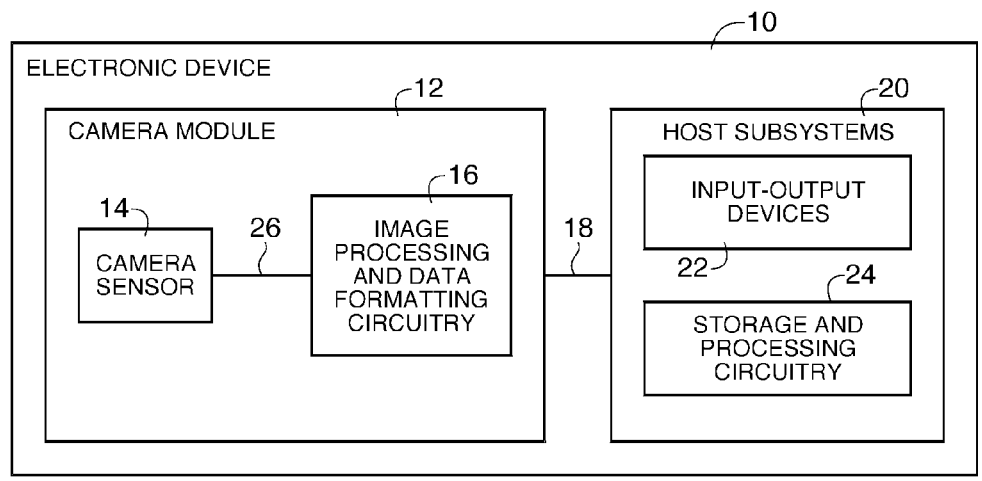
FIG. 1 is a diagram of an illustrative electronic device that may include a camera module with image processing and data formatting circuitry that produces an output data stream that includes fixed-size images at a constant frame rate in accordance with an embodiment of the present invention.

An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels).

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc. Storage and processing circuitry 24 may have a fixed memory allocation for images from camera module 12 and may therefore require images from module 12 be provided at a certain file size and a certain frame rate.

Figure 2:
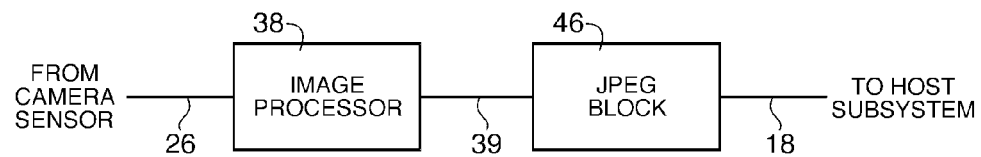
FIG. 2 is a diagram of image processing and data formatting circuitry of the type shown in FIG. 1 that includes an image encoder that produces an output data stream that includes fixed-size images at a constant frame rate in accordance with an embodiment of the present invention.

Image processing and data formatting circuitry 16 that may be used in device 10 is shown in FIG. 2. As shown in FIG. 2, image processor 38 may receive video and still image data from camera sensor 14 of FIG. 1 via path 26. Image processor 38 may perform operations such as pixel processing operations and color processing operations. Pixel processing may include, as examples, correction of dead pixels and de-noising operations. Color processing may include, as examples, white balance adjustments, exposure adjustments, and color matrix processing to convert images to a desired color space (e.g., YUV).

Image processor 38 supplies image frames at its output. In particular, frames of video and still image data that have been processed by image processor 28 may be supplied using output 39. Data on output 39 may be processed in a capture path. If desired, data on output 39 may also be processed in a preview path or a scaled multiframe processing path (not shown).

As shown in FIG. 2, the capture path for circuit 36 may include JPEG block 46 (i.e., an image compression circuit block). When activated, JPEG block 46 may compress images from image processor 38 and provide corresponding compressed versions of the images to host subsystem 20 (FIG. 1) via path 18 (e.g., in the form of JPEG files). JPEG block 46 may produce compressed versions of images at a fixed size and a constant frame rate (e.g., each of the compressed images may have the same data size and the compressed images may be provided to host subsystem 20 at a constant frame rate). In general, the fixed size and constant frame rate produced by a particular JPEG block are configurable (e.g., the fixed size and constant frame rate produced by JPEG block 46 may vary between electronic devices and, if desired, may vary over time). If desired, JPEG block 46 may include input buffers and/or output buffers. JPEG block 46 (and/or image processor 38) may scale images to increase or decrease the resolution of images from camera sensor 26.

Image data being processed by a conventional JPEG encoder is shown in FIGS. 3 and 4. Image data is grouped into a number of minimum coded units (MCUs) and each MCU is encoded by a JPEG encoder. Each MCU is composed of a number of 8×8 blocks of pixels. The composition of each MCU depends on the image color format. For example, a MCU includes two 8×8 pixel blocks of Y component data, one 8×8 pixel block of U component data and one 8×8 pixel block of V component data in a YUV 4:2:2 image color format.

Each 8×8 pixel block is subjected to discrete cosine transform (DCT), quantization, and Huffman encoding. FIG. 4 shows the DCT coefficients that result from the direct cosine transform being applied to a block of 8×8 image pixels. The upper-left coefficient $DCT_{00}$ 104 is a DC coefficient (i.e., a coefficient representing the mean value). All of the other DCT coefficients 106 represent AC coefficients. To achieve higher compression ratio by exploiting the redundancy among neighboring blocks, the DC coefficient of the DCT coefficients is differentially encoded by using the previously encoded data as prediction for the current data. A JPEG decoder needs to have correct previous data in order to correctly decode the future data. If an error, such as transmission error, occurs in the previous data, all subsequent data using those erroneous data as prediction will be corrupted. Therefore, JPEG standard introduces restart markers which reset the prediction and fresh decoding can start after each restart marker. Restart markers are inserted periodically by the JPEG encoder into the compressed data. The number of MCUs in between two consecutive restart markers is called restart interval.

Conventional JPEG encoders, however, are not capable of producing JPEG images that have a fixed size at a constant frame rate. Conventional JPEG encoders occasionally drop frames when attempting to produce JPEG images at a fixed size resulting in a non-constant frame rate. Data being output from a conventional fixed output size JPEG encoder is shown in FIG. 5.

As shown in FIG. 5, a conventional JPEG encoder outputs a first image 108 (i.e., a first frame 108) that has a pre-determined file size starting at time $t_0$.

From $t_0$ to time $t_1$, the conventional JPEG encoder outputs image data. Typically, outputting image data includes outputting a number of (restart interval) MCUs such as image block 112 followed by a restart marker if more image data remains after the MCUs are output. For example, first image data block 112 (i.e., a restart interval number of MCUs) may be transmitted at time $t_0$ followed by first restart marker 110, additional image data blocks and restart markers (not shown), final restart marker 114, and final image block 116.

In order to produce JPEG images at a predetermined fixed size, the conventional JPEG encoder compresses an image such that image data blocks 112 and 116 and restart markers 110 and 114 are smaller than the fixed size. Following transmission of the last block of image data 116, the conventional JPEG encoder transmits padding data 118 to increase the size of the JPEG file being outputted to the required final size.

Padding data 118 is inserted during vertical blanking period 120 (e.g., a period from time $t_1$ to time $t_2$ that is between image frames and in which no image data is transmitted).

When encoding an image with a conventional JPEG encoder, it is not possible to predict the final encoded size of an image with sufficient accuracy. As a result, the amount of padding data 118 that is required to increase the JPEG output size to the required fixed size will vary with each JPEG image. As illustrated in the FIG. 5 example, the required amount of padding data 118 sometimes exceeds the amount that could transmitted within the limited time period provided by vertical blanking period 120. In these situations, transmission of padding data 118 extends beyond time $t_2$ to time $t_3$.

When the image sensor is operating at a constant frame rate, frame 122 (e.g., the subsequent frame) starts at time $t_2$. However, because the transmission of padding data 118 extends beyond time $t_2$ to time $t_3$, JPEG encoding of frame 122 does not start until time $t_4$ and the subsequent frame is dropped. Because JPEG encoding and transmission of the next frame or image such as frame 122 does not begin at time $t_2$, the time required in order to maintain the required constant frame rate output, but instead begins at time $t_4$ the conventional JPEG encoder is unable to maintain the required constant frame rate output.

JPEG encoder 46 of FIG. 2, however, can insert padding data that is distributed throughout transmission of a frame. For example, padding data can be inserted before restart markers as well as during a vertical blanking period. Because the padding data is distributed in this way, there is less risk that transmission of padding data will extend beyond blanking period 216 (as can occur in the conventional arrangement of FIG. 5). The output JPEG stream from JPEG encoder 46 may also be compliant with the JPEG standard, so that any standard JPEG decoder can decode the output JPEG stream from JPEG encoder 46. To achieve JPEG standard compliance, the padding data may include a number of '0xFF' bytes. A diagram of the output JPEG data stream from JPEG encoder 46 is shown in FIG. 6.

As shown in FIG. 6, JPEG encoder 46 may produce images 200 and 218 at a pre-determined file size and at a constant frame rate. Encoder 46 may generate and output image 200 to host subsystems 20 (FIG. 1) over path 18 between times $t_5$ and $t_8$. The time over which each image is output (i.e., the difference between times $t_5$ and $t_8$) may be pre-determined and may be constant for each image of a stream of images produced by JPEG encoder 46 (e.g., image 218 and subsequent images may each be output over a magnitude of time equal to the difference between times $t_5$ and $t_8$).

The frame rate at which JPEG encoder 46 outputs images may be configurable. As examples, the magnitude of the difference between times $t_5$ and $t_8$ may vary between devices, may vary between different modes of operation (e.g., JPEG encoder 46 may output images at a first frame rate in a first mode, JPEG encoder 46 may output images at a second frame rate in a second mode, etc.), may be configured by a user, may be configured by a value stored in memory (e.g., memory in camera module 12 or host subsystems 20), etc.

Between times $t_5$ and $t_8$, JPEG encoder 46 outputs image 200. JPEG encoder 46 may first output a first block of image data 206 followed by a first block of padding data 202, first restart marker 204, a plurality of image data blocks and restart markers, final restart marker 210 (for the n-1'th image data block), final image block 212, and padding blocks 208 and 214. Encoder 46 may then generate and output sets of padding data blocks 208, restart markers 210, and image data blocks 212 for each restart interval of minimum coded units (MCU). If desired, padding data blocks 208 may not be transmitted with each restart marker but may instead only be transmitted with each group of two or more restart markers (e.g., encoder 46 may transmit a single padding data block for each group of two or more restart markers). With another suitable arrangement, encoder 46 may not transmit any padding data blocks 208 until a certain percentage of an image has been encoded (e.g., to help prevent excessive padding).

Following transmission of the last block of image data 212, JPEG encoder 46 transmits padding data block 214 to increase the size of the JPEG file being outputted to the required final size. Padding data block 214 may be inserted during a blanking period 216 (e.g., a period from time $t_6$ to time $t_8$ that is between image frames and in which no image data is transmitted). Because JPEG encoder 46 has distributed padding data blocks throughout transmission of image 200, the amount of padding data 214 that needs to be transmitted during period 216 may be small enough to ensure that all of padding data 214 can be transmitted by time $t_7$ and before time $t_8$. With this type of arrangement, encoder 46 is able to begin transmission of frame 218 at time $t_8$ and the required constant frame rate is maintained.

JPEG compression ratio varies with the image content. In order to output an image file having the desired output size, JPEG encoder 46 may vary the size of padding data blocks such as blocks 202, 208, and 214 based on the amount of compressed data that has been generated. In general, encoder 46 may vary the size of padding data blocks in real time during transmission of an image. For example, a first set of image blocks (i.e., MCUs) may be encoded by encoder 46 at a compression ratio into JPEG blocks with a first file size, but a second subsequent set of image blocks encoded at the same compression ratio may be encoded into JPEG blocks with a second larger file size. Encoder 46 may then decide to reduce the size of padding data blocks transmitted with a third set of image blocks to compensate for the additional file size consumed by the second set of image blocks. In another example, if the first file size is too small to be on track for outputting the desired fixed output size, encoder 46 may increase the size of padding data blocks for subsequent sets of image blocks such as the second and third sets. With these types of arrangements, encoder 46 may be able to compensate midway through transmission of an image if a portion of the image has attributes that vary its output size.

An example of logic that encoder 46 may use in producing JPEG images on path 18 that have a predetermined output file size and are encoded at a predetermined frame rate is described in connection with the following equations. These equations may be calculated by encoder 46 or other logic circuitry at control check points. There may be a control check point associated with each restart marker 204 and 210 of FIG. 6 or, if desired, each control check point may be associated with a group of two or more of the restart markers.

Using equation 1, encoder 46 may determine how much data needs to be output to reach the required predetermined output file size (e.g., how much additional data needs to be output after the current control check point and before time $t_8$).

$$\text{remaining\_data\_size} = \text{fixed\_jpeg\_size} - \text{sent\_out\_size} \quad (1)$$

In equation 1, "remaining_data_size" represents how much data needs to be output to reach the required predetermined output file size, "fixed_jpeg_size" represents the required predetermined output file size (i.e., the desired fixed JPEG output size), and "sent-out-size" represents the amount of encoded image data already produced by encoder 46. If desired, "sent-out-size" may include padding data already inserted by encoder 46 into the data stream on path 18.

Using equation 2, encoder 46 may determine how many clock cycles remain (i.e., how many clock cycles are between the current control check point and the start of the next frame or the start of blanking period 216).

$$\text{remaining\_clk\_cycles} = \text{remaining\_time}/\text{out\_clk\_speed} \quad (2)$$

In equation 2, "remaining_clk_cycles" represents how many clock cycles remain (e.g., during transmission of image frame 200 of FIG. 8, how many clock cycles remain until time $t_6$ or time $t_8$ and the start of transmission of image frame 218), "remaining_time" represents the remaining time (e.g., at any given time during transmission of image frame 200 of FIG. 8, the time until time $t_6$ or $t_8$), and "out_clk_speed" represents the output clock speed (e.g., the clock frequency of communications path 18).

Using equation 3, encoder 46 may determine the maximum amount of data (i.e., image and padding data) that can be delivered over path 18 during the remaining time.

$$\text{remaining\_deliver\_size} = \text{remaining\_clk\_cycles} * \text{output\_bus\_width} \quad (3)$$

In equation 3, "remaining_deliver_size" represents the maximum amount of data (i.e., image and padding data) that can be delivered over path 18 during the remaining time and "output_bus_width" represents the data width of communications path 18. As examples, path 18 may have a width such as 8 bit, 16 bit, 32 bit, etc.

Using equation 4, encoder 46 may determine the current compression ratio.

$$\text{current\_compression\_ratio} = \text{current\_jpeg\_size}/\text{current\_input\_size} \quad (4)$$

In equation 4, "current_compression_ratio" represents the current compression ratio (e.g., the amount that the current image is being compressed using the current compression and quality settings), "current_jpeg_size" represents the total amount of image data produced by encoder 46 prior to the current control check point, and "current_input_size" represents the original un-encoded size of the image data encoded by encoder 46 prior to the current control check point (i.e., the size of image data for the current image frame received over path 39 of FIG. 2 prior to the current control check point).

Using equation 5, encoder 46 may estimate the amount of image data that encoder 46 will produce over the remainder of the current image frame using the current compression ratio ("current_compression_ratio").

$$\text{estimated\_remaining\_jpeg\_size} = \text{remaining\_input\_size}/\text{current\_compression\_ratio} \quad (5)$$

In equation 5, "estimated_remaining_jpeg_size" represents an estimate of the amount of image data that encoder 46 will produce over the remainder of the current image frame using the current compression ratio and "remaining_input_size" represents the amount of un-encoded image data that remains to be encoded by encoder 46.

Using equation 6, encoder 46 may calculate the difference between the remaining output needed to reach the required size (i.e., how much data still needs to be output to reach the required predetermined output file size) and the estimated output size of the remaining image data (i.e., the amount of image data that encoder 46 will produce over the remainder of the current image frame using the current compression ratio).

$$D1 = \text{remaining\_data\_size} - \text{estimated\_remaining\_jpeg\_size} \quad (6)$$

In equation 6, D1 represents the difference between the required output size remaining and the estimated output size of the remaining image data.

Using equation 7, encoder 46 may calculate the difference between the maximum amount of data (i.e., image and padding data) that can be delivered over path 18 during the remaining time and the remaining output needed to reach the required size (i.e., how much data still needs to be output to reach the required predetermined output file size).

$$D2 = \text{remaining\_deliver\_size} - \text{remaining\_data\_size} \quad (7)$$

In equation 7, D2 represents the difference between the maximum amount of data that can be delivered over path 18 during the remaining time and the remaining output needed to reach the required size. D2 should always be kept greater than zero. If D2 were allowed to drop below zero, it would not be possible to reach the required output size without extending transmission of a frame into the time allotted for the subsequent frame (e.g., a frame would have to be dropped and the required frame rate could not be maintained).

Using equations 8, 9, and 10, encoder 46 may determine how much padding data such as padding data blocks 202 and 208 to add before restart markers 202 and 210 and to determine if JPEG compression ratios need to be increased to ensure that D1 is close to or equal to zero at the end of encoding an image (e.g., to ensure that D1 is close to or equal to zero at time $t_6$ at the end of encoding image 200) while also ensuring that D2 remains above zero.

$$\text{If } (D1 > P*D2) \text{ and } (D1 > 0) \text{ add padding data in the amount of } f1(D1 - P*D2, t) \text{ else if } (D1 < 0) \text{ reduce JPEG data by the amount of } f2(abs(D1), t) \text{ end} \quad (8)$$

$$f1(x,t) = x*t*k1 \quad (9)$$

$$f2(x,t) = x*t*k2 \quad (10)$$

In equation 8, "abs" represents an absolute value function and P is a parameter that may have a constant or a variable value. In general, values of P that are less than one may be used to reduce the likelihood that D2 drops below zero. Values of P that are close to zero, such as 0.2, may result in additional padding data being added earlier in an encoded JPEG image while values of P that are close to one, such as 0.8, may result in padding data being delayed and added in later in the transmission of an encoded JPEG image. In equations 8, 9, and 10, t represents the time elapsed in transmission of a frame and may reset to zero at the beginning of transmission of each frame (e.g., t may be equal to zero at time $t_5$ in transmission of frame 200 and may be equal to one at time $t_8$ when transmission of frame 200 ends). In equations 9 and 10, k1 and k2 may be constant factors with preset values. Equations 9 and 10 are merely examples of functions f1 and f2 and, in general, any suitable functions f1 and f2 may be provided.

After performing the calculations of equations 8, 9, and 10, encoder 46 may implement the results by either adding padding data or reducing the amount of JPEG data being sent over path 18. Encoder 46 may reduce the amount of JPEG data being sent over path 18 by, for example, zeroing out some high frequency DCT coefficients for future image blocks (i.e., subsequent MCUs). As one example, after performing the calculations of equations 8, 9, and 10 for an (N-1) image block, encoder 46 may generate padding data 208 for the $N^{th}$ image block in the amount of f1(D1−P*D2, t) or may reduce the amount of JPEG data for the $N^{th}$ image block (and, if desired, all subsequent image blocks) by the amount of f2(abs(D1), t).

After transmitting the last image data block, encoder 46 may transmit padding data such as padding data 214 during blanking period 216 to increase the final size of the output encoded image to the predetermined file size. Because of the logic used by encoder 46 in incorporating padding data throughout transmission of an image, the amount of padding data 214 that needs to be transmitted over blanking period 216 may be minimized, thereby ensuring transmission of padding data 214 does not extend past period 216 and that subsequent frames are not dropped.

Various embodiments have been described illustrating imaging systems with fixed output sizes and frame rates.

An electronic device may have an image sensor array that captures images and an image encoder. The image encoder may encode images from the image sensor into an image format such as a Joint Photographic Experts Group (JPEG) format.

The electronic device may have host subsystems configured to receive images that have a predetermined size and a fixed frame rate. The image encoder may insert padding data between blocks of image data sometimes referred to as a restart marker interval. As an image is encoded, the image encoder may vary the amount of padding data between image data blocks to ensure that the final encoded image is close to, without being larger than, the required predetermined size. In order to output an encoded image with the predetermined size, the image encoder may transmit additional padding during a blanking period prior to transmission of a subsequent image such that the final encoded image is equal to the required predetermined size.

The foregoing is merely illustrative of the principles of this invention which can be practiced in other embodiments.

What is claimed is:

1. A method of generating a data stream of encoded image frames using an image encoder in an electronic device, wherein each of the encoded image frames has a given predetermined file size and wherein the encoded image frames are transmitted in the data stream at a given predetermined frame rate, the method comprising:

with the image encoder and for a given image frame in the data stream, inserting into the data stream a first block of encoded image data during a first time period and inserting into the data stream a second block of encoded image data during a second time period that is after the first time period;

after the beginning of the first time period and prior to the beginning of the second time period, determining if the image encoder is on track to encode the given image frame at the given predetermined file size; and with the image encoder, for the given image frame, and between the first time period and the second period, inserting a given block of padding data into the data stream, wherein the given block of padding data has a size that is varied in response to the determination of if the image encoder is on track to encode the given image frame at the given predetermined file size.

2. The method defined in claim 1 further comprising:

with the image encoder and for the given image frame, inserting into the data stream a final block of encoded image data during a third time period that is after the second time period; and with the image encoder, for the given image frame, and after the third time period, inserting an additional block of padding data into the data stream during a blanking period before another encoded image frame is inserted into the data stream of encoded image frames by the image encoder.

3. The method defined in claim 1 the method further comprising:

with the image encoder, before the first time period, and for the given image frame, inserting into the data stream a first plurality of blocks of encoded image data;

with the image encoder, after the second time period, and for the given image frame, inserting into the data stream a second plurality of blocks of encoded image data; and with the image encoder and for the given image frame, inserting additional blocks of padding data into the data stream, wherein each of the additional blocks of padding data is associated with a respective one of the blocks of encoded image data from the first and second pluralities of blocks of encoded image data.

4. The method defined in claim 3 wherein inserting the given block of padding data into the data stream comprises:

calculating a remaining file size value by subtracting at least the combined file size of the first plurality of blocks of encoded image data and the first block of encoded image data from the given predetermined file size.

5. The method defined in claim 4 wherein each of the encoded image frames is an encoded version of an un-encoded image frame, wherein each of the un-encoded image frames has a file size, and wherein the first plurality of blocks of encoded image data are associated with a first portion of a given un-encoded image frame, and wherein inserting the given block of padding data into the data stream comprises:

calculating a current compression ratio by dividing the combined file size of the first plurality of blocks of encoded image data and the first block of encoded image data by the file size of the first portion of the given un-encoded image frame.

6. A method of generating a data stream of encoded image frames using an image encoder in an electronic device, wherein each of the encoded image frames has a given predetermined file size and wherein the encoded image frames are transmitted in the data stream at a given predetermined frame rate, the method comprising:

with the image encoder and for a given image frame in the data stream, inserting into the data stream a first block of encoded image data during a first time period and inserting into the data stream a second block of encoded image data during a second time period that is after the first time period;

with the image encoder, for the given image frame, and between the first time period and the second period, inserting a given block of padding data into the data stream;

with the image encoder, before the first time period, and for the given image frame, inserting into the data stream a first plurality of blocks of encoded image data;

with the image encoder, after the second time period, and for the given image frame, inserting into the data stream a second plurality of blocks of encoded image data; and with the image encoder and for the given image frame, inserting additional blocks of padding data into the data stream, wherein each of the additional blocks of padding data is associated with a respective one of the blocks of encoded image data from the first and second pluralities of blocks of encoded image data, wherein inserting the given block of padding data into the data stream comprises:

calculating a remaining file size value by subtracting at least the combined file size of the first plurality of blocks of encoded image data and the first block of encoded image data from the given predetermined file size, wherein each of the encoded image frames is an encoded version of an un-encoded image frame, wherein each of the un-encoded image frames has a file size, and wherein the first plurality of blocks of encoded image data are associated with a first portion of a given un-encoded image frame, and wherein inserting the given block of padding data into the data stream comprises:

calculating a current compression ratio by dividing the combined file size of the first plurality of blocks of encoded image data and the first block of encoded image data by the file size of the first portion of the given un-encoded image frame, wherein the given un-encoded image frame includes the first portion that has been encoded and includes a second portion that includes a portion that has not yet been encoded and a portion associated with the second block of encoded image data and wherein inserting the given block of padding data into the data stream comprises:

calculating an estimated remaining encoded file size value by dividing the file size of the second portion of the given un-encoded image frame by the current compression ratio.

7. The method defined in claim 6 wherein inserting the given block of padding data into the data stream comprises:

determining if the image encoder is on track to encode the given image frame at the given predetermined file size by subtracting the estimated remaining encoded file size value from the remaining file size value.

8. The method defined in claim 7 wherein, when the image encoder is on track to encode the given image frame at a file size that is less than the given predetermined file size, inserting the given block of padding data into the data stream comprises inserting a sufficient amount of padding data such that the image encoder is on pace to encode the given image frame at a file size that is equal to the given predetermined file size.

9. The method defined in claim 7 wherein inserting into the data stream the first block of encoded image data comprises encoding image data with the image encoder at a first compression ratio and wherein, when the image encoder is on track to encode the given image frame at a file size that is greater than the given predetermined file size, inserting into the data stream the second block of encoded image data comprises encoding image data with the image encoder at a second compression ratio, and wherein the second compression ratio is greater than the first compression ratio.

10. The method defined in claim 1 further comprising:

for each of the encoded image frames, inserting blocks of encoded image data and padding data into the data stream, wherein the blocks of encoded image data and padding data for each individual encoded image frame are inserted into the data stream within a period of time determined by the given predetermined frame rate.

11. The method defined in claim 1 further comprising:

for each of the encoded image frames, inserting blocks of encoded image data and padding data into the data stream, wherein the blocks of encoded image data and padding data for each individual encoded image frame have a combined file size equal to the given predetermined file size.

12. The method defined in claim 1 further comprising:

for each of the encoded image frames, inserting blocks of encoded image data and padding data into the data stream, wherein the blocks of encoded image data and padding data for each individual encoded image frame are inserted into the data stream within a period of time determined by the given predetermined frame rate, and wherein the blocks of encoded image data and padding data for each individual encoded image frame have a combined file size equal to the given predetermined file size.

13. A method comprising:
   with an image encoder in an electronic device, producing a data stream of encoded image frames at a given frame rate, wherein producing the stream of encoded image frames comprises producing each of the image frames at a given file size; and
   with the image encoder, inserting a given amount of padding data into the data stream between a first encoded image portion of a given image frame and a second encoded image portion of the given image frame, wherein the first encoded image portion of the given image frame corresponds to a first portion of a given unencoded image frame, wherein the second encoded image portion of the given image frame corresponds to a second portion of the given unencoded image frame, and wherein inserting the padding data into the data stream between the first encoded image portion of the given image frame and the second encoded image portion of the given image frame comprises:
      determining the given amount of the padding data by dividing the size of the second portion of the given unencoded image frame by a current compression ratio.

14. The method defined in claim 13 further comprising:
   with the image encoder and for the given image frame, inserting into the data stream a final encoded image portion of the given image frame after inserting the first and second encoded image portions of the given image frame; and
   with the image encoder, for the given image frame, and after interesting into the data stream the final encoded image portion, inserting padding data into the data stream during a blanking period before another image frame in the data stream of encoded image frames is inserted into the data stream by the image encoder.

15. The method defined in claim 13 further comprising:
   determining if the image encoder is on track to encode the given image frame at the given file size.

16. The method defined in claim 13, wherein the given image frame includes a plurality encoded image portions including and in addition to the first and second encoded image portions, the method further comprising:
   with the image encoder and for the given image frame, inserting blocks of padding data into the data stream between at least some of the plurality of encoded image portions.

17. The method defined in claim 13 wherein the image encoder comprises a Joint Photographic Experts Group (JPEG) image encoder and wherein producing the stream of encoded image frames comprises producing a stream of image frames encoded in a JPEG compatible format.

18. An electronic device comprising:
   a host subsystem configured to receive a data stream of encoded image frames at a given predetermined frame rate, wherein each of the encoded image frames has a given predetermined file size; and
   an image encoder that produces the data stream of encoded image frames by, for each of the encoded image frames, inserting padding data into the data stream between at least a first encoded portion of that image frame and a second encoded portion of that image frame, wherein the image encoder determines the amount of the padding data that is inserted into the data stream between the first and second encoded portions at least partly based on the given predetermined file size, the file size of the first encoded portion, and an estimated file size of the second encoded portion.

19. The electronic device defined in claim 18 further comprising:
   image sensor circuitry that converts incident light into digital signals that are provided to the image encoder.

* * * * *